(12) United States Patent
Lindberg et al.

(10) Patent No.: US 11,424,661 B2
(45) Date of Patent: Aug. 23, 2022

(54) SHAFT COUPLING

(71) Applicant: KONECRANES GLOBAL CORPORATION, Hyvinkää (FI)

(72) Inventors: Teppo Lindberg, Hyvinkää (FI); Jussi Puhakka, Hyvinkää (FI); Pekka Laakkonen, Helsinki (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 71 days.

(21) Appl. No.: 16/963,622

(22) PCT Filed: Jan. 22, 2019

(86) PCT No.: PCT/FI2019/050050
§ 371 (c)(1),
(2) Date: Jul. 21, 2020

(87) PCT Pub. No.: WO2019/145605
PCT Pub. Date: Aug. 1, 2019

(65) Prior Publication Data
US 2021/0066996 A1    Mar. 4, 2021

(30) Foreign Application Priority Data

Jan. 23, 2018  (FI) .................................... 20185062

(51) Int. Cl.
*H02K 7/00* (2006.01)
*F16D 1/116* (2006.01)
(Continued)

(52) U.S. Cl.
CPC ............. *H02K 7/003* (2013.01); *F16D 1/116* (2013.01); *H02K 7/083* (2013.01); *H02K 7/116* (2013.01); *F16D 2001/103* (2013.01)

(58) Field of Classification Search
CPC ........ H02K 7/003; H02K 7/083; H02K 7/116; F16D 1/116; F16D 2001/103
(Continued)

(56) References Cited

U.S. PATENT DOCUMENTS 4,195,718 A    4/1980  Schmohe
5,716,279 A    2/1998  Ham et al.
(Continued)

FOREIGN PATENT DOCUMENTS

CN    102118076 A    7/2011
CN    102252036 A    11/2011
(Continued)

OTHER PUBLICATIONS

International Search Report, issued in PCT/FI2019/050050, dated Mar. 26, 2019.
(Continued)

*Primary Examiner* — Terrance L Kenerly
(74) *Attorney, Agent, or Firm* — Birch, Stewart, Kolasch & Birch, LLP

(57) ABSTRACT

A shaft coupling includes a first shaft supported by a bearing at a first end, and a second shaft supported by a bearing at a second end. The first shaft and second shaft are coaxially arranged so that the second end of the first shaft is against the first end of the second shaft. On an end surface of the second end of the first shaft, there is a recess, and a protrusion protrudes from the end surface of the first end of the second shaft, and the recess receives the protrusion. The shaft coupling includes only one third bearing, as well as a coupler which receives the second end of the first shaft and the first end of the second shaft. With such a solution, a greater radial error may be allowed between the shafts without the structures of the coupling point being overloaded.

13 Claims, 3 Drawing Sheets

(51) Int. Cl.
   *H02K 7/08* (2006.01)
   *H02K 7/116* (2006.01)
   *F16D 1/10* (2006.01)

(58) Field of Classification Search
   USPC .................................................. 310/40 R
   See application file for complete search history.

(56) References Cited

U.S. PATENT DOCUMENTS

| | | | |
|---|---|---|---|
| 6,299,360 | B1 | 10/2001 | Dougherty et al. |
| 2003/0228188 | A1 | 12/2003 | White et al. |
| 2011/0163621 | A1 | 7/2011 | Kim |
| 2012/0004044 | A1* | 1/2012 | Conger ............... F16D 3/227 464/141 |
| 2014/0116608 | A1 | 5/2014 | Sato et al. |
| 2015/0226270 | A1 | 6/2015 | Struber et al. |
| 2016/0305487 | A1 | 10/2016 | Parker |

FOREIGN PATENT DOCUMENTS

| | | |
|---|---|---|
| CN | 103790985 A | 5/2014 |
| CN | 105899830 A | 8/2016 |
| DE | 1 138 686 | 10/1952 |
| DE | 26 44 414 A1 | 3/1978 |
| DE | 33 39 951 A1 | 5/1985 |
| DE | 101 36 240 A1 | 2/2003 |
| DE | 10 2014 223 390 A1 | 5/2016 |
| EP | 2 905 885 A2 | 8/2015 |
| GB | 708018 | 4/1954 |
| GB | 770683 A | 3/1957 |
| JP | 2917-106589 A | 6/2017 |
| RU | 2 307 440 C2 | 9/2007 |
| SU | 897119 A3 | 1/1982 |

OTHER PUBLICATIONS

Written Opinion of the International Searching Authority, issued in PCT/FI2019/050050, dated Mar. 26, 2019.
Russian Decision on Grant and Search Report dated Apr. 15, 2021 for Application No. 2020126692 with a partial English translation.
Indian Office Action for Indian Application No. 202017029350, dated Feb. 26, 2021, with English translation.
Extended European Search Report for European Application No. 19743583.7, dated Feb. 4, 2021.
Chinese Office Action and Search Report for Chinese Application No. 201980008768.4, dated Dec. 16, 2021, with an English translation.

* cited by examiner

SHAFT COUPLING

FIELD OF THE INVENTION

The present invention relates to power transmission in shaft couplings.

DESCRIPTION OF THE PRIOR ART

It is previously known to connect shafts coaxially to each other as a power transmission so that a bearing is arranged at a first and second end of a first and second shaft, that is, the coupling comprises the total of four bearings.

A problem with the aforementioned solution is that a radial error between the shafts due to the installation of the shafts may cause major loading on the structures of the coupling point of the shafts.

SUMMARY OF THE INVENTION

It is an object of the invention to develop a device that allows the aforementioned problem to be solved. The object of the invention is achieved with a device which is characterised by what is disclosed is the independent claim. Preferred embodiments of the invention are disclosed in the dependent claims.

The aforementioned object is achieved by a shaft coupling which comprises a first shaft having a first end and a second end, and a first bearing being arranged in the vicinity of the first end, and that the invention further comprises a second shaft having a first end and a second end, and a second bearing being arranged in the vicinity of the second end, and said first shaft and second shaft are coaxially arranged so that the second end of the first shaft is against the first end of the second shaft.

On an end surface of the second end of said first shaft there is a recess, and there is a protrusion protruding from the end surface of the first end of the second shaft, and said recess receives said protrusion so that a side surface of the protrusion and a side surface of the recess set against each other. The side surface of the protrusion or the side surface of the recess, or both of said mating surfaces, is/are shaped curved in the axial direction of the first shaft and second shaft.

To support the first and second shaft, the shaft coupling comprises, in addition to said first bearing and second bearing, only one third bearing arranged in the vicinity of the coupling point of the first shaft and second shaft.

The shaft coupling further comprises a coupler that receives the second end of the first shaft and the first end of the second shaft, and non-rotatably connects these to each other in order to transmit power between said first and second shaft.

Such a shaft coupling allows a larger radial error between the shafts, that is, the shafts need not be as precisely rectilinear as in the known solutions, without major extra loading falling on the structures of the coupling point of the shafts.

BRIEF DESCRIPTION OF THE FIGURES

The invention will now be described in closer detail in connection with the preferred embodiments, with reference to the accompanying drawings in which.

DESCRIPTION OF AT LEAST ONE EMBODIMENT

Figure 1:
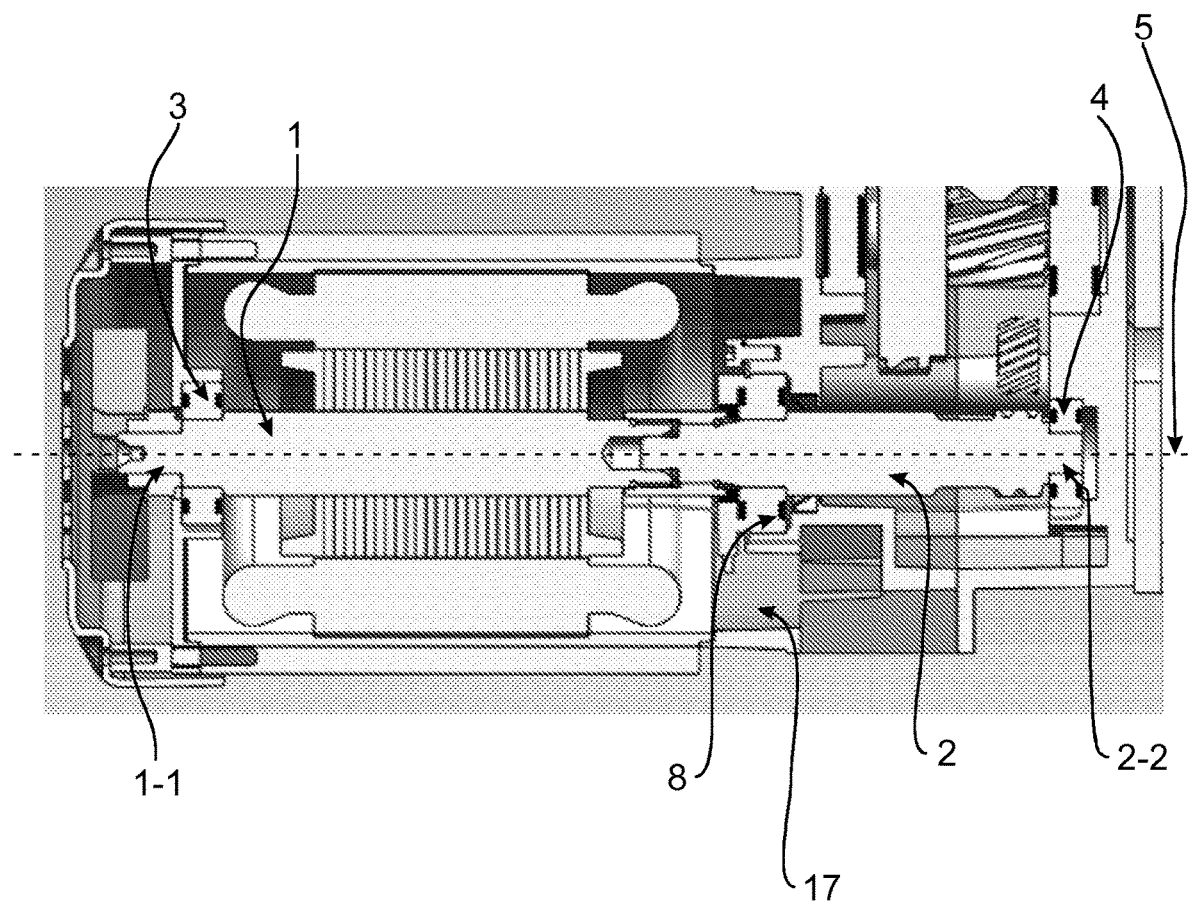
FIG. 1 is a cross-sectional view of a first embodiment of the invention.

FIG. 1 shows, by way of example, an overall view of the first embodiment of the shaft coupling. Referring to FIG. 1, the embodiment in question comprises a first shaft 1 having a first end 1-1 and a second end 1-2, and a first bearing 3 being arranged in the vicinity of the first end 1-1. The shaft coupling further comprises a second shaft 2 having a first end 2-1 and a second end 2-2, and a second bearing 4 being arranged in the vicinity of the second end 2-2. Said first shaft 1 and second shaft 2 are coaxially arranged, in other words the centre lines of both shafts are on the same axis 5. The shafts are further so arranged that the second end 1-2 of the first shaft 1 is against the first end 2-1 of the second shaft 2. The first shaft 1 may be a motor shaft and the second shaft 2 may be a gear shaft, as shown in FIG. 1 by way of example.

In addition to said first bearing 3 and second bearing 4, the shaft coupling comprises, to support the first shaft 1 and second shaft 2, only one third bearing 8 arranged in the vicinity of the coupling point of the first shaft 1 and second shaft 2. In the embodiment of FIG. 1, said third bearing 8 is arranged in the vicinity of the first end 2-1 of the second shaft 2, on the gear side. Therefore, the entire shaft coupling has no more than three bearings to support the shafts.

Figure 2:
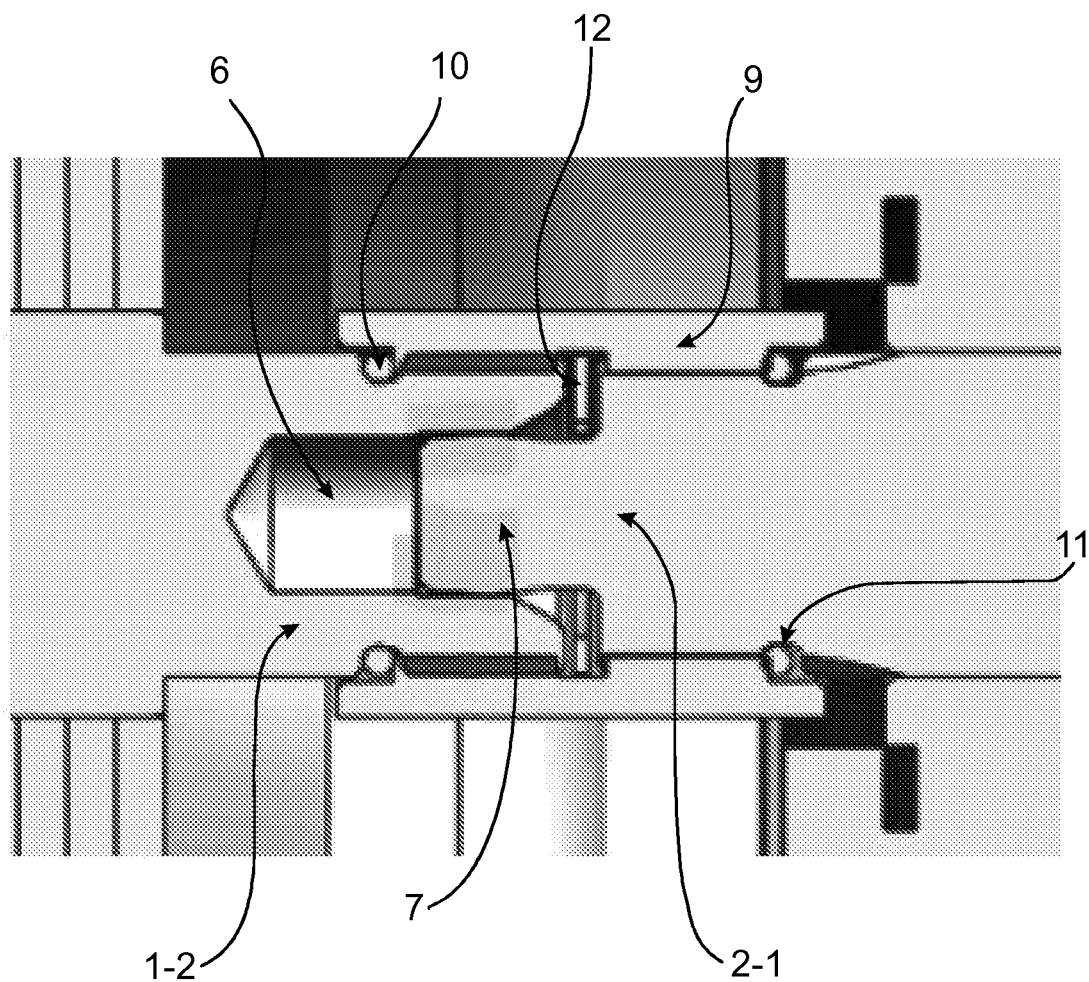
FIG. 2 is an enlarged cross-sectional view of the embodiment of FIG. 1.

FIG. 2 is an enlarged cross-sectional view of the embodiment of FIG. 1. FIG. 2 shows that there is, on an end surface of the second end 1-2 of the first shaft 1, a recess 6, and that there is a protrusion 7 protruding from the end surface of the first end 2-1 of the second shaft 2, and said recess 6 receives said protrusion 7 so that a side surface of the protrusion and a side surface of the recess set against each other. The side surface of said protrusion 7 or the side surface of the recess 6, or both of said mating surfaces, is/are shaped curved in the axial direction of the first shaft 1 and second shaft 2. In this example in question, said protrusion 7 is barrel-shaped and the side surface of said recess 6 is shaped to match the shape of the side surface of the protrusion 7, taking into account that the first shaft 1 and second shaft 2 may be axially matched when assembled. The term "barrel-shaped" in this context means that the diameter of the protrusion is at its largest at its centre part, and when moving axially away from the centre part, the diameter of the protrusion 7 decreases.

According to an example, the protrusion 7 is made barrel-shaped and the recess 6 is made a straight circular cylinder. The essential matter is selecting the mutual shapes of the protrusion 7 and recess 6 is that the first shaft 1 and the second shaft 2 get mutual support in the radial direction, but said shafts maintain the mutual setting to each other when supported, even if they had a slight angle error between the longitudinal axes of the shafts.

FIG. 2 further shows that the shaft coupling comprises a coupler 9. Said coupler 9 receives the second end 1-2 of the first shaft 1 and the first end 2-1 of the second shaft 2 and non-rotatably connects these to each other in order to transmit power between said first shaft 1 and second shaft 2.

In the embodiment of FIG. 2, said coupler 9 surrounds the second end 1-2 of the first shaft 1 and the first end 2-1 of the second shaft 2. The outer surface of the second end 1-2 of the first shaft 1 is shaped as a counterpart of the inner surface of the coupler 9 to prevent their mutual rotation, and similarly, the outer surface of the first end 2-1 of the second shaft 2 is formed as a counterpart for the inner surface of the coupler 9 to prevent their mutual rotation. The coupler 9 forms a groove/shaft coupling between the first shaft 1 and second shaft 2.

It is characteristic of the first shaft coupling shown in FIG. 2 that the coupler 9 transmits the torque between the first shaft 1 and second shaft 2, that is, the mutual rotation of the shafts is prevented. It is characteristic of the gap between the second end 1-2 of the first shaft and the first end 2-1 of the second shaft fitted together that by their fit, radial displacement is prevented insofar as the protrusion 7 and recess 6 are concerned.

Usually, such a shaft coupling comprises four bearings. However, a fourth bearing is not needed in the embodiment shown in FIGS. 1 and 2. A support arrangement of three bearings together with the shaping of the second end 1-2 of the first shaft 1 and the first end 2-1 of the second shaft 2 allows a slightly larger radial error between the shafts without said coupler and/or bearings being under excessive loading on each rotation. This, in turn, extends the service life of the devices and reduces downtime as well as the amount of alignment work of the shafts. In the embodiment of FIG. 2, the coupling between the first shaft 1 and the second shaft 2 additionally comprises a first O ring 10 and a second O ring 11 to ensure the tightness of the shaft coupling. The first O ring 10 is arranged in the vicinity of the second end 1-2 of the first shaft 1 and the second O ring 11 is arranged in the vicinity of the first end 2-1 of the second shaft 2. In addition, the coupling comprises a retaining ring 12 between the first shaft 1 and second shaft 2.

In the bearing of the first shaft 1 and second shaft 2, one such bearing is reserved for both, which receives the axial load. Therefore, the shaft coupling is not subjected to a large axial force. The shaft coupling has a small clearance in the axial direction, allowing a small axial movement between the second end 1-2 of the first shaft and the first end of the second shaft. This small clearance caters for the manufacturing tolerance of the shafts, installation accuracy, thermal movement etc. After assembly, a clearance in the axial direction remains between the faces of the shafts, which is slightly larger than the thickness of the retaining ring. This way, the shafts do not touch each other even by the shear ring at the faces. The goal is that the shafts are in contact with each other only by the cylindrical or nearly cylindrical, such as barrel-shaped, side surfaces of the protrusion and recess.

By means of said O rings, a closed grease chamber is sealed in the coupling area. During assembly, petroleum jelly is provided in the grease chamber to arrange grease lubrication. Between the second end 1-2 of the first shaft 1 and the first end 2-1 of the second shaft 2, a retaining ring 12 is arranged, the task of which is to ensure the position of the coupler 9 in the axial direction so that the coupler 9 does not move axially all the way to the O ring and that no possibility of shearing is subjected to the O rings. The retaining ring 12 is an inner ring for which, during assembly of the coupler 9, a circular groove 13 has been internally rotary-cut on the inner surface of the coupler 9. The depth of the groove 13 slightly reaches the internal gearing, but the profile of the groove 13 does not extend from the inside outward as deep as to extend all the way to the bottom of the groove of the axial gearing.

Figure 3:
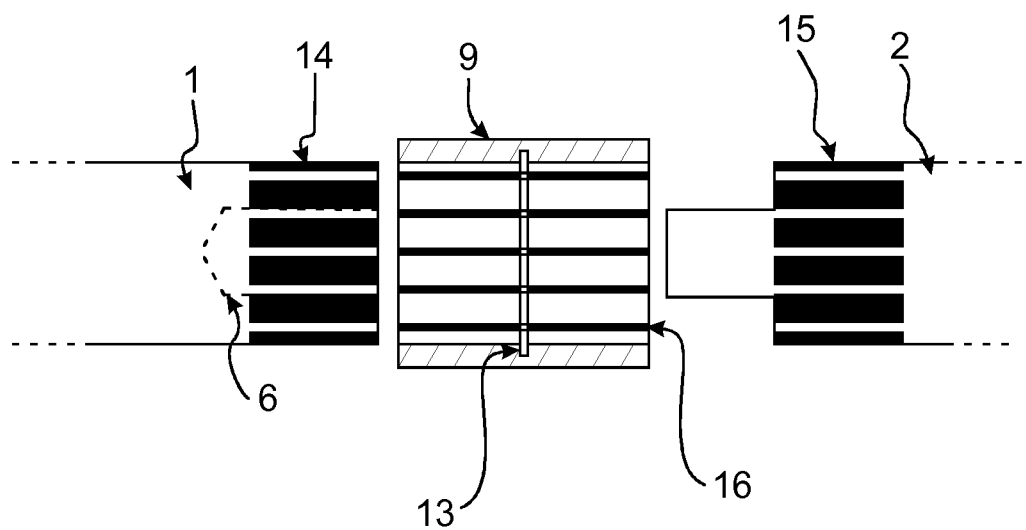
FIG. 3 is a conceptual view of a gearing of the first shaft, second shaft, and coupler.

FIG. 3 is a conceptual view of the gearing of the first shaft 1, second shaft 2, and coupler 9 by way of example. FIG. 3 is not to scale and the parts shown may differ from what is shown. In the example of FIG. 3, the second end 1-2 of the first shaft 1 comprises a first gearing 14, the first end 2-1 of the second shaft 2 comprises a second gearing 15, and the inner surface of the coupler 9 comprises a third gearing 16. In addition, in FIG. 3 a cross section of the coupler 9 is shown to show the third gearing 16. As concerns a potential angle error between the shafts, it is possible to arrange somewhat more tolerance on the coupling so that on at least one of the gearings 14, 15, instead of straight gearing, a slightly barrel-shaped gearing is manufactured.

An advantage of a coupling connected with a coupler is that it is balanced in relation to rotating, unlike a coupling arranged with a parallel key which, as concerns rotation, is unbalanced. A particular advantage of a coupling connected with a coupler is that the shafts of the coupling may be rotated in a higher revolution range. Previously known is, for example, a solution in which the shafts are coupled by a claw clutch and the rotation of which at 4500 RPM has caused damages with the shaft diameters in the 80 to 100 mm range. The solution and shaft coupling according to the independent claim successfully work at the speed range of 9000 RPM.

The coupler is advantageously manufactured by broaching so that an internal axial gearing may be achieved on it. In broaching, a long tool is pulled through the coupler, which chips the required gears, advantageously with one pull. The tool has the shape of the gearing, but the gears of the tool are a negative of the coupler gears. It is common for the gearing that a trapezoidal gear has 30 degree flank angles.

In shaft couplings of a motor shaft and gear shaft it is previously known to arrange flanges in connection with the coupling point, both on the motor and gear sides, inside which the bearings located in the vicinity of the second end of the motor shaft and the first end of the gear shaft have been arranged. However, the embodiment of FIG. 1 comprises one flange 17, only, which comprises the third bearing 8. Said flange 17 is arranged on the gear side, only, in the vicinity of the first end 2-1 of the second shaft 2, and thus there is no flange at all on the motor side. Alternatively, said flange could be arranged on the motor side, too, whereby the third bearing would be located in the vicinity of the second end of the first shaft, and correspondingly the gear would not comprise a flange at all. The removal of the second flange is advantageous, because that results in the total dimension of the shaft coupling shortening, and space is thus saved.

In the disclosed first embodiment it is also assumed that the first shaft is a motor shaft and the second shaft is a gear shaft. Alternatively, the first shaft could be a gear shaft and the second shaft a motor shaft. The Figures also show that the coupling point of the shafts is on the motor side. The coupling point could, however, be located on the gear side, too. Furthermore, in said embodiment the coupler is arranged to surround the coupling point of the first shaft and second shaft. Alternatively, the coupler may surround said shafts only partly, or be between the shafts.

The most advantageous positioning method of the bearings is such where two bearings are placed on the gear side and one on an electric motor. In such a case, the potential error caused by arranging the shaft coupling by interconnecting the shafts, is formed on the outer end of the electric motor shaft, in relation to the coupling, that is, on the air gap end side. This way, the effect of the error may be shifted to a point where it does not much matter.

An alternative method is to place two bearings on the electric motor, and one on the gearing near the shaft coupling, and the potential error in the shaft position is moved to the gear, further away from the shaft coupling. Here on the gear shaft, at the further end in relation to the shaft coupling, there may be a gear in meshed contact, to which meshed contact a very large deviation is not, however, formed, because the small displacement (i.e. error) of the shaft in question of the gear is relatively far away, that is, on the shaft coupling end side.

When the motor and gear is assembled, the mutual placement of different diameters is designed so that the assembly may be done in steps when parts are axially brought closer to each other. In the axial direction, the coupler is adapted on either end of the shaft, the shafts are joined, and finally the flange connections of the electric motor and gear are connected to each other.

The typical materials of the shafts are so chosen that the hardest material is in the shaft of the gear and this may be carburizing steel, for example. The second hardest material is in the shaft of the electric motor, and this may be for example, tempering steel such as 42CrMo4. The coupler is made of soft steel, such as constructional steel.

Between the second end of the first shaft and the first end of the second shaft, mutual support has been arranged, which support may take the place of one bearing in the conventional technical solution which, as known, uses the total of four bearings. So, in the shaft coupling according to the independent claim 1, the quantity of bearings is reduced from four to three, and the structure uses three bearings supplemented by one mutual support. The solution according to the independent claim further aims at a center-to-center coupling of the shafts, which coupling considers the three degrees of freedom in the coupling of the shafts as follows:

axial movement (correspondingly, axial force) is allowed in small scale, but prevented in large scale by obstacles or collars formed in the structure;

radial movement (correspondingly, radial force) is restricted as restricted by the side surface of the protrusion and the side surface of the recess; and rotational movement (correspondingly, torque) is restricted by means of the coupler, which non-rotatably connects the first and second shaft to each other.

The shaft coupling according to the independent claim 1 is applied at least to shafts of the size range 10 to 30 mm. By means of the shaft coupling in question, two shafts of power transmission may be coupled to each other so that the effect of an angle error or radial error between them may practically be eliminated. In prior art solutions, such as in the size range with axle diameter less than 20 mm, a radial error of less than 0.05 mm should be achievable. In the range 0.1 mm radial error, so much strain is caused on the coupling joint that the power transmission will fail in a relatively short time. A person skilled in the art will find it obvious that, as technology advances, the basic idea of the invention may be implemented in many different ways. The shaft coupling and its embodiments are thus not restricted to the examples described above but may vary within the scope of the claims.

The invention claimed is:

1. A shaft coupling comprising: a first shaft having a first end and a second end, and a first bearing being arranged in the vicinity of the first end; and a second shaft having a first end and a second end, and a second bearing being arranged in the vicinity of the second end, wherein said first shaft and second shaft are coaxially arranged so that the second end of the first shaft is against the first end of the second shaft, wherein there is, on an end surface of the second end of the first shaft, a recess, and there is a protrusion protruding from the end surface of the first end of the second shaft, and said recess receives said protrusion so that a side surface of the protrusion and a side surface of the recess set against each other, and wherein the side surface of the protrusion is barrel-shaped, such that a diameter of the protrusion is largest at a center part thereof, and the diameter of the protrusion decreases when moving axially away from the center part, wherein in addition to said first bearing and second bearing, to support the first shaft and second shaft, the shaft coupling comprises only one third bearing arranged in the vicinity of the coupling point of the first shaft and second shaft, and wherein the shaft coupling further comprises a coupler which receives the second end of the first shaft and the first end of the second shaft and non-rotatably connects these to each other in order to transmit power between said first shaft and second shaft.

2. The shaft coupling as claimed in claim 1, wherein
said third bearing is arranged in the vicinity of the second end of the first shaft.

3. The shaft coupling as claimed in claim 1, wherein
said third bearing is arranged in the vicinity of the first end of the second shaft.

4. The shaft coupling as claimed in claim 1, wherein
the outer surface of the second end of the first shaft is shaped as a counterpart of the inner surface of the coupler to prevent their mutual rotation, and
the outer surface of the first end of the second shaft is formed as a counterpart for the inner surface of the coupler to prevent their mutual rotation.

5. The shaft coupling as claimed in claim 1, wherein
said coupler are least partly surrounds the first shaft and the second shaft.

6. The shaft coupling as claimed in claim 1, wherein
the coupling between the first shaft and the second shaft additionally comprises a first O ring and a second O ring to ensure the tightness of the shaft coupling.

7. The shaft coupling as claimed in claim 6, wherein
the first O ring is arranged in the vicinity of the second end of the first shaft and the second O ring is arranged in the vicinity of the first end of the second shaft.

8. The shaft coupling as claimed in claim 1, wherein
the shaft coupling comprises a retaining ring between the first shaft and second shaft.

9. The shaft coupling as claimed in claim 1, wherein
the first shaft is a motor shaft and the second shaft is a gear shaft.

10. The shaft coupling as claimed in claim 1, wherein
the first shaft is a gear shaft and the second shaft is a motor shaft.

11. The shaft coupling as claimed in claim 1, wherein
the second end of the first shaft, the first end of the second shaft, and the inner surface of the coupler comprise a gearing.

12. A shaft coupling comprising:
a first shaft having a first end and a second end, and a first bearing being arranged in the vicinity of the first end; and
a second shaft having a first end and a second end, and a second bearing being arranged in the vicinity of the second end,
wherein said first shaft and second shaft are coaxially arranged so that the second end of the first shaft is against the first end of the second shaft,
wherein there is, on an end surface of the second end of the first shaft, a recess, and there is a protrusion protruding from the end surface of the first end of the second shaft, and said recess receives said protrusion so that a side surface of the protrusion and a side surface of the recess set against each other, and wherein the side surface of the protrusion or the side surface of the recess, or both of said mating surfaces, is/are shaped curved in the axial direction of the first shaft and second shaft, wherein in addition to said first bearing and second bearing, to support the first shaft and second shaft, the shaft coupling comprises only one third bearing arranged in the vicinity of the coupling point of the first shaft and second shaft, wherein the shaft coupling further comprises a coupler which receives the second end of the first shaft and the first end of the second shaft and non-rotatably connects these to each other in order to transmit power between said first shaft and second shaft, and wherein the coupling between the first shaft and the second shaft additionally comprises a first O ring and a second O ring to ensure the tightness of the shaft coupling.

13. The shaft coupling as claimed in claim 12, wherein the first O ring is arranged in the vicinity of the second end of the first shaft and the second O ring is arranged in the vicinity of the first end of the second shaft.

\* \* \* \* \*